US012662887B2

(12) United States Patent
Timmins, Jr.

(10) Patent No.: US 12,662,887 B2
(45) Date of Patent: Jun. 23, 2026

(54) LOST CIRCULATION MATERIAL COMPRISING RECLAIMED FIBERGLASS WIND TURBINE BLADES

(71) Applicant: EVERPOINT SERVICES INC., Houston, TX (US)

(72) Inventor: James Roper Timmins, Jr., Houston, TX (US)

(73) Assignee: EVERPOINT SERVICES, INC., Houston, TX (US)

( * ) Notice: Subject to any disclaimer, the term of this patent is extended or adjusted under 35 U.S.C. 154(b) by 0 days.

(21) Appl. No.: 19/038,294

(22) Filed: Jan. 27, 2025

(65) Prior Publication Data

US 2025/0243720 A1    Jul. 31, 2025

Related U.S. Application Data

(60) Provisional application No. 63/625,123, filed on Jan. 25, 2024.

(51) Int. Cl.
| | |
|---|---|
| *E21B 43/34* | (2006.01) |
| *B29B 17/04* | (2006.01) |
| *E21B 21/00* | (2006.01) |
| *E21B 21/06* | (2006.01) |
| *B29K 307/04* | (2006.01) |
| *B29K 309/08* | (2006.01) |
| *B29K 311/14* | (2006.01) |
| *B29L 31/08* | (2006.01) |

(52) U.S. Cl.
CPC ........ *E21B 21/003* (2013.01); *B29B 17/0412* (2013.01); *E21B 21/062* (2013.01); *B29K 2307/04* (2013.01); *B29K 2309/08* (2013.01); *B29K 2311/14* (2013.01); *B29L 2031/085* (2013.01)

(58) Field of Classification Search
CPC ............................. E21B 21/003; E21B 43/34
USPC ........................................................ 166/282
See application file for complete search history.

(56) References Cited

U.S. PATENT DOCUMENTS

| | | | | |
|---|---|---|---|---|
| 7,284,611 | B2 * | 10/2007 | Reddy | .................... C09K 8/516 166/295 |
| 7,612,021 | B2 * | 11/2009 | Chatterji | .............. C09K 8/5045 507/140 |

(Continued)

OTHER PUBLICATIONS

A4 Solutions, Products & Services, https://web.archive.org/web/20250124031434/https://a4solutionsinc.com/products-and-services, 2 pages, Jan. 24, 2025.

(Continued)

*Primary Examiner* — William D Hutton, Jr.
*Assistant Examiner* — Ashish K Varma
(74) *Attorney, Agent, or Firm* — Norton Rose Fulbright US LLP

(57) ABSTRACT

The present disclosure provides new and innovative lost circulation material that is fabricated from mechanically reducing wind turbine blades to fragments (e.g., fibers, particles, etc.). The lost circulation material includes fibrous materials from one or more wind turbine blades, such as fiberglass, carbon fiber, balsa wood, and resin. The lost circulation material can be used as an additive in drilling mud or cement to treat the problem of lost circulation. In this way, fabricating lost circulation material from wind turbine blades provides safe and permanent disposal of industrial byproducts.

8 Claims, 3 Drawing Sheets

(56) References Cited

U.S. PATENT DOCUMENTS

| | | | |
|---|---|---|---|
| 8,613,319 B2 * | 12/2013 | Sodhi ..................... | C09K 8/428 |
| | | | 166/305.1 |
| 11,352,545 B2 * | 6/2022 | Amanullah ........... | E21B 21/003 |

OTHER PUBLICATIONS

Alshammari, A.N., "Experimental Study on the Role of Fiberglass Additives in Improving Cement Performances in Oil Wells", The University of Tulsa—Drilling Research Projects, Advisory Board Meeting, 28 pages, May 2025.

Berends, A., "Advanced 4 Solutions coming to Woodward", The Woodward News, 3 pages, Jul. 7, 2022.

Pope, A., "Oklahoma wind turbines don't last forever, but now they can find second life in Woodward", KOSU, All Things Considered, 22 pages, Sep. 24, 2024.

Woodbridge Advanced Solutions, Wind Turbine Blade Recycling Company, "Wind Turbine Blade End-of-Life Replacement", 8 pages, Aug. 19, 2024.

"Department of Energy Launches Prize to Jumpstart Wind Turbine Materials Recycling Industry", *Department of Energy, Office of Energy Efficiency & Renewable Energy,* Jul. 2023.

Gignac, J., "Wind Turbine Blades Don't Have to End Up in Landfills", *Union of Concerned Scientists,* Oct. 2020.

Korey, M et al. "Development of Wind Turbine Blade Recycling Baselines in the United States." *IOP Conf. Ser.: Mater. Sci. Eng.;* 1293.1, (2023): 012018.

Sproul, E. et al . "Life cycle assessment of wind turbine blade recycling approaches in the United States;" *IOP Conf. Ser.: Mater. Sci. Eng.* 1293 (2023) 012027 doi:10.1088/1757-899X/1293/1/012027.

* cited by examiner

LOST CIRCULATION MATERIAL COMPRISING RECLAIMED FIBERGLASS WIND TURBINE BLADES

PRIORITY CLAIM

The present application claims priority to and the benefit of U.S. Provisional Application 63/625,123, filed Jan. 25, 2024, the entirety of which is herein incorporated by reference.

TECHNICAL FIELD

A composition of matter comprising recycled wind turbine blade materials, suitable for use as a lost circulation material, is provided. Also provided is a mixture, suitable for injecting into a well, comprising a liquid drilling fluid or cement and recycled wind turbine blade materials. Methods of forming such compositions of matter and mixtures are also provided. Methods of using such compositions of matter and mixtures, including as part of drilling and/or completing a well.

BACKGROUND

During drilling operations, drilling fluid, known as drilling mud, is pumped down the drill string, out of the bit or casing shoe, and up the wellbore annulus (the space between the outer diameter of the drill string and the borehole wall). This fluid cools the bit, maintains hydrostatic control of formation pressure, and conveys cuttings to the surface allowing drilling to continue. In certain situations where hydrostatic pressure exerted by a fluid column (drilling mud or cement) exceeds formation pressure, and in which a formation is sufficiently porous and permeable, fluid may be lost into the formation, which is a process known as "lost circulation." Lost circulation can also occur in cases where wellbore pressure exceeds the formation fracture gradient and a fracture is initiated into which fluid can escape, as well as in cases where the formation is naturally fractured, vugular, or cavernous. Lost circulation represents a costly, time consuming, and potentially hazardous problem to oil and gas operations. In most cases, drilling operations cannot proceed until losses have been cured, and aside from the cost of the fluid lost to the formation, the reduced height of the fluid column could result in a loss of hydrostatic control of formation pressure, resulting in a loss of well control, leading to formation kicks or blowouts. In situations where losses are encountered, the drilling fluid in typically treated with lost circulation material (LCM).

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure provides new and innovative lost circulation material that is fabricated from mechanically reducing one or more wind turbine blades to fragments (e.g., fibers, particles, etc.). The lost circulation material includes fibrous materials from the one or more wind turbine blades, such as fiberglass, carbon fiber, balsa wood, and resin. The lost circulation material can be used as an additive in drilling mud or cement to treat the problem of lost circulation. In this way, fabricating lost circulation material from one or more wind turbine blades provides safe and permanent disposal of industrial byproducts. The present LCM may be used in well drilling, cementing, and/or completion operations.

In an example, a method of the present disclosure includes adding a lost circulation material to liquid drilling fluid or cement to thereby form a mixture. The lost circulation material includes a plurality of fragments comprising: fiberglass of one or more wind turbine blades, resin of one or more wind turbine blades, carbon fiber of one or more wind turbine blades, and balsa wood of one or more wind turbine blades. At least some of the plurality of fragments have a transverse dimension within a range of 1 to 2000 microns, inclusive. The method further includes introducing the mixture into a geological formation.

In an example, a method of the present disclosure includes introducing into a geological formation a mixture that includes a lost circulation material and liquid drilling fluid or cement. In this example, the lost circulation material includes a plurality of fragments comprising: fiberglass of one or more wind turbine blades, resin of one or more wind turbine blades, carbon fiber of one or more wind turbine blades, and balsa wood of one or more wind turbine blades. At least some of the plurality of fragments have a transverse dimension within a range of 1 to 2000 microns, inclusive.

Furthermore, all numerical ranges herein should be understood to include all integers, whole or fractions, within the range, inclusive of the ends of the ranges. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The terms "comprise" and any form thereof such as "comprises" and "comprising," "have" and any form thereof such as "has" and "having," and "include" and any form thereof such as "includes" and "including" are open-ended linking verbs. As a result, a composition of matter that "comprises," "has," or "includes" one or more elements possesses those one or more elements but is not limited to possessing only those elements. Likewise, a method that "comprises," "has," or "includes" one or more steps possesses those one or more steps but is not limited to possessing only those one or more steps.

Any embodiment of any of the compositions of matter and methods can consist of or consist essentially of—rather than comprise/have/include—any of the described elements, steps, and/or features. Thus, in any of the claims, the term "consisting of" or "consisting essentially of" can be substituted for any of the open-ended linking verbs recited above in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments are described above and others are described below.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

A further understanding of the nature and advantages of the present disclosure may be realized by reference to the following drawings.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case.

Every year a significant number of wind turbine blades are sent to landfills in the United States as a result of wind turbines being decommissioned at the end of their service life. Primarily constructed of fiberglass and resin, the discarded blades do not readily decompose and represent a considerable volume of waste. As decommissioned wind turbine blades have rapidly accumulated in landfills, due to the blades' large size, landfills have begun to reject decommissioned turbine blades, meaning the only option is to pay to store the blades, which aside from being unsightly, represents thousands of tons of waste which will take centuries to degrade. There is currently no cost-effective way to recycle or reuse decommissioned wind turbine blades in large quantities.

The present disclosure provides a lost circulation material (e.g., composition of matter) that includes one or more reclaimed wind turbine blades, reduced to fragments of a specific size and consistency. The lost circulation material can be used as an additive to cure formation losses during oil and/or gas drilling operations. In various aspects, the lost circulation material includes fiberglass of one or more wind turbine blades, resin of one or more wind turbine blades, carbon fiber of one or more wind turbine blades, balsa wood of one or more wind turbine blades, and other constituent materials used in wind turbine blade construction. In some aspects, at least a portion of each of at least two of the fiberglass, resin, carbon fiber, balsa wood, or other material may come from the same wind turbine blade.

In some aspects, at least some of the fragments have a transverse dimension (e.g., a length) within one of the following ranges: 1 to 2000, 1 to 1000, 1 to 750, 1 to 500, 1 to 125, 125 to 2000, 125 to 1000, 125 to 750, 125 to 500, 125 to 250, 250 to 2000, 250 to 1000, 250 to 750, 250 to 500, 500 to 2000, 500 to 1000, 500 to 750 microns ($\mu$m), inclusive. In some aspects, a mean traverse dimension of the fragments may be 500 $\mu$m. In some aspects, the fiberglass of the one or more wind turbine blades is greater than 90% of the lost circulation material by weight. In some aspects, the lost circulation material may include a dust-reducing additive.

Figure 1:
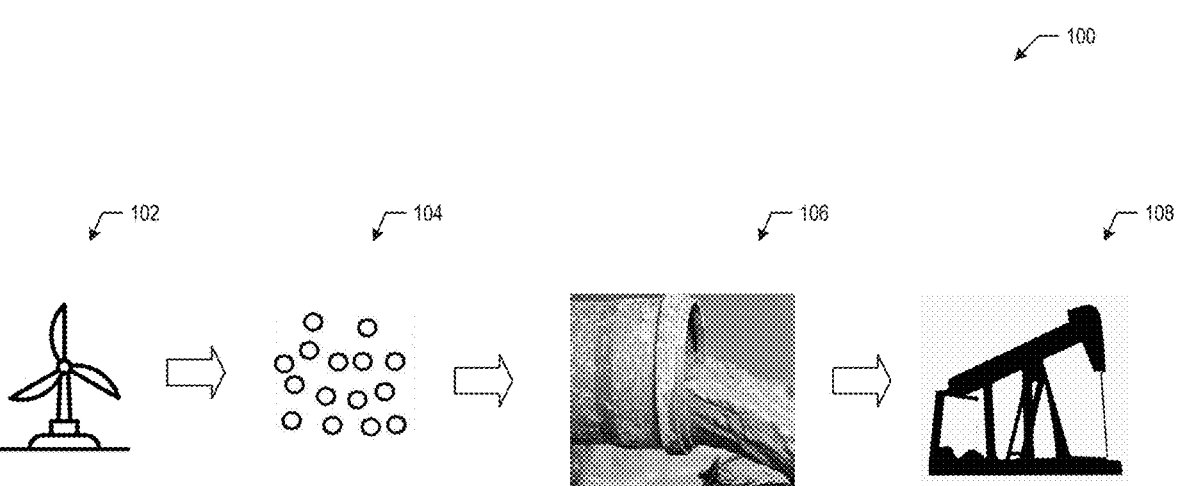
FIG. 1 illustrates a flow diagram of a method of fabricating and using a lost circulation material, according to an aspect of the present disclosure.

FIG. 1 is a flow diagram of a method 100 of fabricating and using a lost circulation material. At 102, a wind turbine blade is mechanically reduced to a plurality of fragments. In various aspects, mechanically reducing the wind turbine blade includes chopping the wind turbine blade into separate components. In some aspects, the separate components may be fibrous and the fibers of the separate components are the plurality of fragments. In such aspects, the fibers of the separate components have a length within one of the following ranges: 1 to 2000, 1 to 1000, 1 to 750, 1 to 500, 1 to 125, 125 to 2000, 125 to 1000, 125 to 750, 125 to 500, 125 to 250, 250 to 2000, 250 to 1000, 250 to 750, 250 to 500, 500 to 2000, 500 to 1000, 500 to 750 microns ($\mu$m), inclusive. In some aspects, a mean length of the fibers may be 500 $\mu$m. In some aspects, the fibers may be generated using a shredder, such as a hydraulic shredder. In some aspects, the separate components may be ground into a granular state and the resulting particles are the plurality of fragments. In such aspects, the particles have a transverse dimension within one of the following ranges: 1 to 2000, 1 to 1000, 1 to 750, 1 to 500, 1 to 125, 125 to 2000, 125 to 1000, 125 to 750, 125 to 500, 125 to 250, 250 to 2000, 250 to 1000, 250 to 750, 250 to 500, 500 to 2000, 500 to 1000, 500 to 750 microns ($\mu$m), inclusive. In some aspects, a mean traverse dimension of the particles may be 500 $\mu$m. In various aspects, the wind turbine blade may be ground into the plurality of fragments without first chopping the blade into separate components.

At 104, the plurality of fragments are sorted. For example, the plurality of fragments may be sorted by size, including by one or more screens possessing openings with a desired dimension from one location defining the respective opening to another location defining the respective opening. In this example, the sorting process allows the particle size distribution of the final product to be adjusted based on the geometry of the formation pore throats themselves. Particle size distribution of the product is expressed in terms of percentiles, in which $d_{10}$ represents the particle size (in microns) below which 10% of the product volume falls, $d_{50}$, which represents the particle size below which 50% of the product volume falls, and $d_{90}$, which represents the particle size below which 90% of the product volume falls. A narrow particle size distribution (a small size variation between $d_{10}$ and $d_{90}$) may be preferrable when attempting to heal a formation of known pore throat sizes, whereas a broad distribution may be preferrable when formation data is unavailable.

In another example, the plurality of fragments may be sorted to remove metallic constituents that could interfere with downhole electronics or plug downhole tools. For instance, the metallic constituents may include stone, ferrous, and other metallic material. With the plurality of fragments sorted, the lost circulation material is fabricated. Fabricating the lost circulation material therefore includes 102 and 104. In some aspects, the lost circulation material may be treated with resin, water, or other liquid additives to reduce the amount of dust created while handling, thereby reducing health hazards.

At 106, the lost circulation material can then be mixed with drilling fluid (e.g., mud) and/or cement. In various aspects, the lost circulation material is added to the liquid drilling fluid and/or cement in a concentration of 3 to 100 pounds per barrel of oil (lb/bbl), inclusive. In an example, the lost circulation material can be used in "background"

6

12 ppg oil-based mud, electrical stability of 500, oil water ratio 80:20, water phase salinity of 250,000 ppm, 20 ppb LCM concentration, 190 μm ceramic disc; and 12 ppg oil-based mud, electrical stability of 500, oil water ratio 80:20, water phase salinity of 250,000 ppm, 50 ppb LCM concentration, 2 mm ceramic disc.

Test conditions were 250° F. and 1000 psi differential pressure to accurately represent downhole conditions. Test results are shown in Table 1 below:

| Drilling Fluid | Filter, μm | 1 min Fluid Loss, ml | 7.5 min Fluid Loss, ml | 30 min Fluid Loss, ml | Filter Cake, mm | Spurt Loss, ml | Total Fluid Loss, ml | Static Filtration Rate |
|---|---|---|---|---|---|---|---|---|
| 12.0 ppg (no LCM) | 190 | 0 | 80 | 140 | <1 | 40 | 280 | 44 |
| 12.0 ppg WBM, 20 ppb | 190 | 0 | 2 | 5 | 18 | 0 | 10 | 2 |
| 12.0 ppg WBM, 50 ppb | 2000 slotted | 0 | 0 | 0 | 0 | 0 | 40 | 2 |
| 12.0 ppg OBM (no LCM) | 190 | 150 | 230 | 230 | <1 | 460 | 460 | 0 |
| 12.0 ppg OBM, 20 ppb | 190 | 0 | 0 | 0 | N/A | 0 | 0 | 0 |
| 12.0 ppg OBM, 50 ppb | 2000 slotted | 0 | 0 | 0 | N/A | 0 | 0 | 0 | concentrations closer to the lower end of 3 lb/bbl or as part of an "LCM pill" with concentrations closer to the higher end of 100 lb/bbl.

At 108, the mixture of the liquid drilling fluid or cement with the added lost circulation material may be introduced into a geological formation (e.g., a well), such as to treat the problem of lost circulation. The mixture can be permanently sequestered in oil wells where the mixture will be behind cement and steel pipe indefinitely.

Figure 2:
FIG. 2 is a scanning electron microscope (SEM) image of a surface of an example lost circulation material, according to an aspect of the present disclosure.

FIG. 2 is a SEM image of a surface of an example implementation of the lost circulation material.

Figure 3:
FIG. 3 illustrates a SEM image of a magnified portion of the surface of FIG. 2, according to an aspect of the present disclosure.

FIG. 3 is a SEM image of a magnified portion of the surface of the lost circulation material shown in FIG. 2. The magnification of FIG. 3 shows the fibrous nature of the lost circulation material in this example.

The lost circulation material was tested in a permeability plugging apparatus (PPA) to determine the lost circulation material's ability to bridge (e.g., seal) a porous formation, which was represented by a ceramic disc with 190 μm average pore throat size. The lost circulation material's ability to bridge (e.g., seal) a simulated fracture, which was represented by a slotted disc with 2 mm slots, was also tested. The PPA test runs were performed with the following base fluids and concentrations:

12 pound per gallon (ppg) water-based mud (OBM), 25 ppb bentonite, pH of 10, 190 μm ceramic disc (control, no LCM);

12 ppg, water-based mud (WCM), 25 ppb bentonite, pH of 10, 20 ppb LCM concentration, 190 μm ceramic disc;

12 ppg water-based mud, 25 ppb bentonite, pH of 10, 50 ppb LCM concentration, 2 mm slotted disc;

12 ppg oil-based mud, electrical stability of 500, oil water ratio 80:20, water phase salinity of 250,000 ppm, 190 μm ceramic disc (control, no LCM);

As demonstrated in Table 1, the addition of the lost circulation material reduced fluid loss from 140 to 0 milliliters (ml) in the water-based experiment and from 230 to 0 ml in the oil-based experiment, which demonstrated the lost circulation material's ability to bridge permeable formations as well as induced fractures. Particle size distribution may be tailored to the specific application if the pore throat size of the formation is known. For example, a series of sieves each with a different coarseness may be utilized to accumulate sets of particles with different sizes. When the throat size of the formation pores that the particles are intended to block is known, particles of a particular size can be selected to be used.

In addition to the test results shown in Table 1, the lost circulation material (LCM) was also subjected to an industry standard mud check to test for undesirable interactions of the LCM with the base fluid. American Petroleum Institute Recommended Practice 13B-1 prescribes tests for physical properties of water-based mud, such as density, rheology, water content, solids content, viscosity, electrical stability, and pH. API RP 13B-2 prescribes similar tests for oil-based mud. "Hot rolling" describes the process by which the fluid is heated and agitated to simulate downhole conditions and what affect the downhole conditions might have on the chemical and rheological properties of the fluid. The following test runs were performed using both oil and water-based fluids:

12 ppg water-based fluid (no LCM, control)

12 ppg water-based fluid (10 ppb LCM) prior to hot rolling 12 ppg water-based fluid (10 ppb LCM) hot rolled at 150° F. for 16 hours 12 ppg oil-based fluid (no LCM, control)

12 ppg oil-based fluid (10 ppb LCM) prior to hot rolling 12 ppg oil-based fluid (10 ppb LCM) hot rolled at 150° F. for 16 hours

The rheological properties of the test fluids above are shown in the Table 2 below:

| Measured property | Oil-based mud (control) | Oil-based mud (10 ppb LCM) | Oil-based mud (10 ppb LCM, hot rolled) | Water-based mud (control) | Water based mud (10 ppb LCM) | Water-based mud (10 ppb LCM, hot rolled) |
|---|---|---|---|---|---|---|
| 600 rpm reading @1500 F. | 30 | 32 | 32 | 71 | 79 | 56 |
| 300 rpm reading @1500 F. | 15 | 17 | 17 | 64 | 72 | 46 |
| 200 rpm reading @1500 F. | 9.5 | 12 | 12 | 61 | 69 | 41 |
| 100 rpm reading @1500 F. | 6 | 8 | 8 | 59 | 64 | 36 |
| 6 rpm reading @1500 F. | 1.5 | 4 | 4 | 45 | 43 | 34 |
| 3 rpm reading @1500 F. | 1 | 3 | 3 | 31 | 29 | 25 |
| Plastic Viscosity (cp) | 15 | 15 | 15 | 7 | 7 | 10 |
| Yield Point (lb/100 sq ft) | 0 | 2 | 2 | 57 | 65 | 36 |
| 10 Second Gel | 2 | 3 | 3 | 43 | 43 | 32 |
| 10 Minute Gel | 7 | 3 | 3 | 24 | 24 | 22 |

The test data above demonstrate that the addition of the lost circulation material does not significantly affect rheological properties in a way that might affect operations, such as would an overly thick mud that becomes difficult to pump or a mud that is too thin to suspend cuttings.

As part of the API RP 13B-2 test specific to oil-based fluids, the fluid mixtures of mud and lost circulation material were tested for how the lost circulation material affects emulsion stability, which is the measure of the amount of current required (in volts) to break an oil-water emulsion. A significant reduction in electrical stability would be seen as undesirable, as a weakly-emulsified drilling fluid would be prone to breaking and separating into two phases of oil and water, leading to undesirable outcomes such as fluid loss into the formation, shale hydration, corrosion, etc. The mixtures of mud and the lost circulation material presented only a minor reduction in electrical stability.

| | Oil-based mud (control) | Oil-based mud (10 ppb LCM) | Oil-based mud (10 ppb LCM, hot rolled) |
|---|---|---|---|
| Electrical Stability (volts) | 381 | 356 | 356 |

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the products, systems, and methods are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method comprising:
   adding a lost circulation material to liquid drilling fluid or cement to thereby form a mixture, wherein the lost circulation material includes a plurality of fragments comprising:
      fiberglass of one or more wind turbine blades;
      resin of one or more wind turbine blades;
      carbon fiber of one or more wind turbine blades; and
      balsa wood of one or more wind turbine blades,
      wherein at least some of the plurality of fragments have a transverse dimension within a range of 1 to 2000 microns, inclusive; and
   introducing the mixture into a geological formation.

2. The method of claim 1, wherein the lost circulation material is added to the liquid drilling fluid or cement in a concentration of 3 to 100 pounds per barrel of oil, inclusive.

3. The method of claim 1, wherein the plurality of fragments are fibrous.

4. The method of claim 1, wherein the plurality of fragments are granular.

5. A method comprising:
   introducing into a geological formation a mixture that includes a lost circulation material and liquid drilling fluid or cement, wherein the lost circulation material includes a plurality of fragments comprising:
      fiberglass of one or more wind turbine blades;
      resin of one or more wind turbine blades;
      carbon fiber of one or more wind turbine blades; and
      balsa wood of one or more wind turbine blades,
      wherein at least some of the plurality of fragments have a transverse dimension within a range of 1 to 2000 microns, inclusive.

6. The method of claim 5, wherein the lost circulation material was added to the liquid drilling fluid or cement in a concentration of 3 to 100 pounds per barrel of oil, inclusive.

7. The method of claim 5, wherein the plurality of fragments are fibrous.

8. The method of claim 5, wherein the plurality of fragments are granular.

* * * * *